United States Patent
Damon et al.

(10) Patent No.: US 7,136,385 B2
(45) Date of Patent: Nov. 14, 2006

(54) METHOD AND SYSTEM FOR PERFORMING ASYMMETRIC ADDRESS TRANSLATION

(75) Inventors: Philippe Damon, Carrboro, NC (US); Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 10/017,261

(22) Filed: Dec. 7, 2001

(65) Prior Publication Data

US 2003/0108055 A1    Jun. 12, 2003

(51) Int. Cl.
H04L 12/28    (2006.01)
H04L 12/56    (2006.01)

(52) U.S. Cl. ............... 370/395.31; 370/392; 370/389; 709/238; 709/245

(58) Field of Classification Search ............ 370/392, 370/389, 395.3, 395.31, 401, 409, 397; 709/203, 709/238, 245
See application file for complete search history.

(56) References Cited

U.S. PATENT DOCUMENTS

| | | | |
|---|---|---|---|
| 5,101,402 A | | 3/1992 | Chiu et al. |
| 5,235,595 A | | 8/1993 | O'Dowd |
| 5,426,773 A | | 6/1995 | Chabanet et al. |
| 5,629,933 A | | 5/1997 | Delp et al. |
| 5,850,399 A | | 12/1998 | Ganmukhi et al. |
| 5,856,974 A | * | 1/1999 | Gervais et al. ............ 370/392 |
| 5,935,212 A | | 8/1999 | Kalajan et al. |
| 5,991,302 A | | 11/1999 | Berl et al. |
| 6,473,763 B1 | * | 10/2002 | Corl et al. ................ 707/101 |
| 6,529,897 B1 | * | 3/2003 | Corl et al. ................ 707/2 |
| 6,667,974 B1 | * | 12/2003 | Shigeta ..................... 370/389 |

(Continued)

OTHER PUBLICATIONS

Gordon T. Davis, "Method and System for Providing a Symmetric Key for More Efficient Session Identification", Pending U.S. Appl. No. 09/908,836, filed Jul. 19, 2001.

(Continued)

*Primary Examiner*—Huy D. Vu
*Assistant Examiner*—Chuong Ho
(74) *Attorney, Agent, or Firm*—Sawyer Law Group LLP (57) ABSTRACT

A method and system for performing network address translations for a session in a network is disclosed. The network includes at least one local network domain, and the at least one local network domain includes at least one computer system. Each computer system has a local address and is associated with a global address. The session exchanges packets that travel between the computer system within the local network domain and another computer system which may be outside of the local network domain. Each packet includes source and destination information. The method and system include determining a direction of travel for each packet, inbound or outbound, by searching a global address table for a match of a key for each packet. The key is provided using a portion of the destination information. The global address table includes at least one entry. Each entry corresponds to the global address for a first corresponding computer system. The method and system also include asymmetrically translating the source and destination information for each packet using an address translation table or session table based on whether or not the full match is found. The destination information is translated using information in the session table if the packet is inbound. The source information is translated based on the address translation table if the packet is outbound. The address translation table includes at least one entry. Each entry corresponds to the local address for a first corresponding computer system or a global host name for a shared host.

26 Claims, 5 Drawing Sheets

U.S. PATENT DOCUMENTS

| | | | |
|---|---|---|---|
| 6,687,245 B1 * | 2/2004 | Fangman et al. | 370/356 |
| 6,862,267 B1 * | 3/2005 | Hughes et al. | 370/252 |
| 6,885,667 B1 * | 4/2005 | Wilson | 370/392 |
| 6,886,027 B1 * | 4/2005 | Tajiri et al. | 709/202 |
| 6,888,837 B1 * | 5/2005 | Cunningham et al. | 370/401 |
| 6,928,162 B1 * | 8/2005 | Heddes et al. | 380/28 |
| 2003/0065817 A1 * | 4/2003 | Benchetrit et al. | 709/245 |

OTHER PUBLICATIONS

B. M. Bass et al., "Full Match (FM) search algorithm implementation for a Network Processor", Pending U.S. Appl. No. 09/543,531, filed Apr. 6, 2000.

* cited by examiner

Prior Art

Figure 1

Prior Art

Figure 2

Prior Art

METHOD AND SYSTEM FOR PERFORMING ASYMMETRIC ADDRESS TRANSLATION

CROSS-REFERENCE TO RELATED APPLICATIONS

The present application is related to co-pending U.S. patent application Ser. No. 09/908,836 entitled "METHOD AND SYSTEM FOR PROVIDING A SYMMETRIC KEY FOR MORE EFFICIENT SESSION IDENTIFICATION," filed on Jul. 19, 2001 and assigned to the assignee of the present application. The present application is also related to co-pending U.S. patent application Ser. No. 09/543,531 entitled "FULL MATCH (FM) SEARCH ALGORIGHM IMPLEMENTATION FOR A NETWORK PROCESSOR" filed on Apr. 6, 2000 and assigned to the assignee of the present application.

FIELD OF THE INVENTION

The present invention relates to computer systems, and more particularly to a method and system for more efficiently identifying information for sessions between computer systems, such as a client and a server.

BACKGROUND OF THE INVENTION

Figure 1:
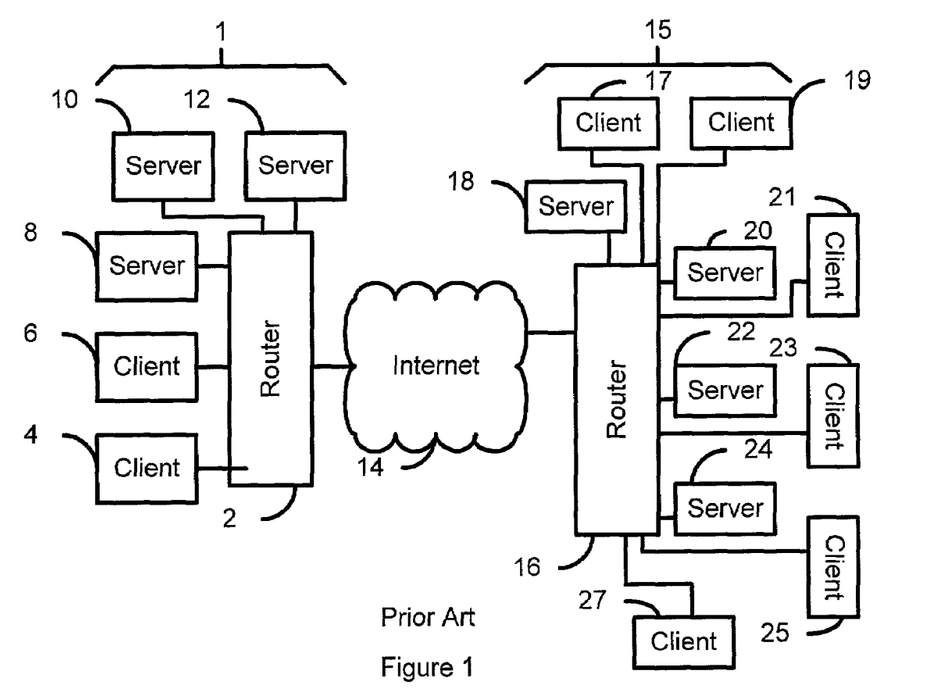
FIG. 1 is a block diagram of a conventional computer network.

Driven by increasing usage of a variety of network applications, such as those involving the Internet, computer networks are of increasing interest. FIG. 1 depicts conventional computer networks 1 and 15 coupled via the Internet 14. The conventional computer network 1 includes router 2, clients 4, and 6 and servers 8, 10 and 12. The conventional computer network 15 includes router 16, servers 18, 20, 22 and 24 and clients 17, 19, 21, 23, 25, 27 and 29. The conventional computer networks 1 and 15 may also have other constituents, including other computer systems and/or additional routers, that are not shown for clarity.

The components of the computer networks 1 and 15 may desire to communicate, for example through the Internet 14. For example, a client 4 may communicate with the server 24 or client 17. Similarly, the server 18 may communicate with the client 4. In order to do so, a session is established between computer systems. In the session, data packets are sent between the computer systems involved in the session. Each packet is associated with a source from which the packet originates and a destination to which the packet is to be sent. Thus the source and destination are each one of the computer systems 4, 6, 8, 10, 12, 18, 20, 22 or 24. Each packet includes information relating to the computer systems involved in the session, typically in an IP five-tuple, that is used to route the packet to the appropriate computer system.

Figure 2:
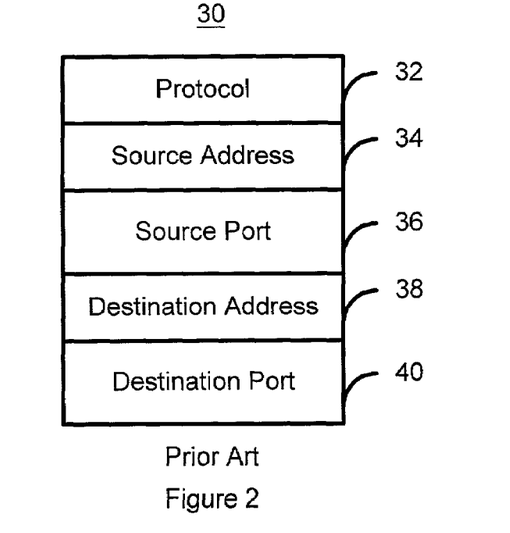
FIG. 2 is a block diagram of a conventional IP five-tuple.

FIG. 2 is a block diagram depicting an IP five-tuple 30. The IP five-tuple 30 is taken from various fields in an IP header and TCP header of a packet. The IP five-tuple 30 includes five fields, the protocol 32, two source fields 34 and 36 and two destination fields 38 and 40. The source fields are the source address 34 and the source port 36. The destination fields are the destination address 38 and the destination port 40. The source address 34 is typically the IP address of the source. The source port 36 and destination port 40 are associated with the software application connected to the TCP protocol layer. The destination address 39 is typically the IP address of the destination for the packet.

In a session, each computer system involved in the session sends packets to the other computer system involved in the session. Thus, packets for a session travel in two directions, to and from each computer system. The destination for a packet traveling in one direction is the source for a packet traveling in the opposite direction. For example, suppose a session is established between the client 4 and the server 20. For a packet traveling from the client 4 to the server 20, the source is the client 4 and the destination is the server 20. However, for a packet traveling from the server 20 to the client 4, the source is the server 20 and the destination is the client 4.

In order to keep track of the ongoing sessions and store information used in routing packets for the sessions, a session table is typically used. The conventional session table is typically kept by a router, such as the routers 2 and 16. Each entry in the session table includes data for a corresponding session. This data is used to forward packets for the session to the appropriate destination using the appropriate ports. The entries are indexed using a concatenation of the protocol 32, source address 34, source port 36, destination address 38 and destination port 40. The concatenation of the protocol 32, source address 34, source port 36, destination address 38 and destination port 40 is typically hashed in order to provide the index for the session.

In addition to utilizing sessions, network address translation may also be performed. Network address is typically used when both global addressing information and local addressing information may be associated with a server or client. Network address translation is often required because there is a limited number of individual IP addresses that are available globally. Network address translation allows IP addresses to be reused within multiple local networks. For example, network address translation may be used where a single server supports multiple logical hosts and multiple logical global IP addresses. Each global IP address typically corresponds to one of the logical hosts. Typically, each host is preserved by allocating a different TCP port number to each logical host within the server. Similarly, network address translation may also be performed when certain host names fan out to multiple servers within a network. For example, referring to FIG. 1, the network 15 may have a host name that could refer to any of the servers 18, 20, 22 and 24 and clients 17, 19, 21, 23, 25 and 27. Thus, any of the servers 18, 20, 22 and 24 may be accessed from outside of the network 15 using the global address and the global port for the network 15. Within the network 15, the servers 18, 20, 22 and 24 and clients 19, 19, 21, 23, 25 and 27 have local addresses and ports used for routing communications within the network 15. Thus, in order to route packets from an external source, such as the client 4, the global address and port are used to reach the network 15, then the local address and port are used to reach a specific one of the components 17, 18, 19, 20, 21, 22, 23, 24, 25 and 27 of the network 15. Similarly, in order to route communications to an external destination, the local address and port are used as the source address 34 and source port 36, respectively, through the router 16. The global address and port are then used as the source address 34 and source port 25 when routing the packet external to the network 15. Consequently, the global address and the local address must be translated. This translation may be based on the specific URL path for server farms that distribute web pages across multiple servers, or may be based on current traffic and processing loads for servers that duplicate web content on multiple servers for performance (i.e. response time) or reliability reasons.

Figure 3:
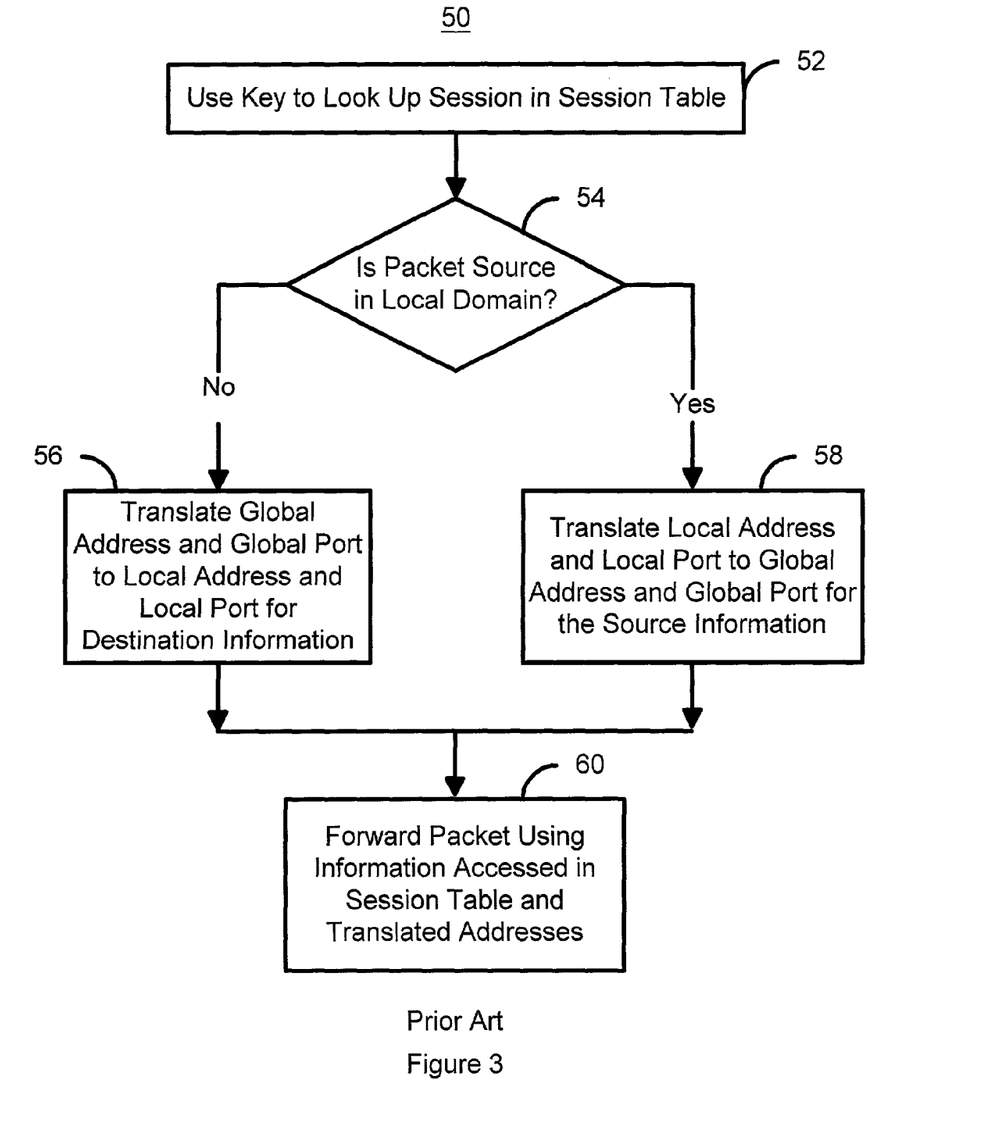
FIG. 3 is a diagram of a method for performing routing using network address translation

FIG. 3 depicts one embodiment of a conventional method 50 for routing packets using network address translation. The method 50 will be described in the context of FIGS. 1 and 2. For clarity, it is presumed that the session is between the server 18 and the client 4 and that the method 50 is performed using the router 16. A key is used to look up the session in the session table, via step 52. The key is typically a concatenation of the protocol 32, the source address 34, source port 36, destination address 38, destination port 40 for the packet being routed. Because of the network address translation discussed above, the key will not only be different for packets flowing in opposite directions, but will also be asymmetric. For example, the key for a packet flowing from the client 4 to the server 18 may be formed using the client's address and port for the source address 34 and source port 36, respectively, and using the global address and global port for the network 15 for the destination address and destination port, respectively. In contrast, a key for a packet flowing from the server 18 to the client 4 will use the client's address and port for the destination address 38 and port 40, respectively, and will use the local address and local port for the source address 34 and source port 36, respectively.

Once the match for the key is found in the search of the session table, the action taken depends upon the match. If the match was for a key formed using the global address and global port as the destination address, then the packet is traveling from the client 4 to the server 18. Thus, it is determined whether the source of the packet is in the local domain, via step 54. Thus, step 54 determines whether the packet is traveling from the client 4 to the server 18. If the source of the packet is not in the local domain, then the destination address and port are translated from the global address and port to the local address and local port, respectively, via step 56. If the source packet is in the local domain, the packet travels from the client 4 to the server 18. The source address and port are then translated from the local address and local port, respectively to the global address and global port respectively, via step 58. After translation in step 56 or 58, the packet is forwarded using the information in the session table that has been accessed and the translated address, via step 60.

Although the conventional method 50 allows the packets for the session to be forwarded to the destination, one of ordinary skill in the art will readily recognize that the method 50 is inefficient. In particular, as described above, there is no symmetry between the source address/port 34/36 and destination address/port 38/40 for packets traveling in opposite directions. Instead, the translation results in a packet traveling from the client having an address for the destination address that is different from the address that a packet traveling from the server has for the source address. Similarly, the packet traveling from the client has a port for the destination port that is different from the port that a packet traveling from the server has for the source port. Furthermore, the data required to perform the conventional network address translation described in steps 56 and 58 is contained in the session table. As a result, the conventional method 50 requires that the session table contain two entries for each session. One entry is indexed using a key that is formed using the global address. Another entry is indexed using a key that is formed using the local address. As a result, the session table may be large. In addition, each time a session is added or removed, two insertions to and two deletions from the session table are required. Thus, additional resources are expended. Furthermore, keeping the two entries synchronized as the session progresses requires additional resources.

Accordingly, what is needed is a system and method for more efficiently identifying sessions. The present invention addresses such a need.

SUMMARY OF THE INVENTION

A method and system for performing network address translations for a session in a network is disclosed. The network includes at least one computer system within a local domain, a second at least one computer system outside of the local domain, and a gateway between the local domain and the global network (i.e. the Internet). Each of the at least one computer system within the local domain has a local address valid only within the local domain, and is associated with a global address usable outside of the local domain. The session consists of an exchange of packets between the at least one computer system within the local domain and the second at least one computer system outside of the local domain. Each of the plurality of packets includes source information and destination information. The method and system comprise a determination of the direction of packet flow by searching a table containing global addresses associated with the at least one computer system within the local domain for a match of a search key for each of the plurality of packets. A match of the search key with an entry in the table indicates that the direction of packet flow is Inbound; that is the packet destination is one of the at least one computer system within the local domain. The search key is provided using a portion of the destination information. The global address table contains at least one entry, each of which corresponds to the global address associated with one or more of the at least one computer system within the local domain. (One global address may correspond to one computer system, or to a plurality of computer systems. Likewise, multiple global addresses may correspond to a single computer system.)

The method and system also comprise selection of one network address translation process for Inbound packets and a different network address translation process for Outbound packets. For Inbound packets, as indicated by finding a matching entry in the Global Address Table, the process continues directly with a search in a table of active sessions. The search key used is based on the IP 5-tuple. In addition to routing information and other session-related parameters, each entry in the session table contains the required local IP address and TCP port number to be used for the associated session to replace the global destination parameters in the Inbound packet. For Outbound packets, as indicated by a failure to find a matching entry in the Global Address Table, the process continues with a search in a Network Address Translation Table. The search key used is based on source parameters from the packet (i.e. IP SA, TCP SP). This search should always find an entry corresponding to the search key. The contents of this table entry are the global address and port used to replace the local source parameters in the packet. Thus for outbound packets, the network address translation is accomplished prior to accessing the session table for required forwarding information.

As with the process for Inbound packets, the search key used to access the desired entry in the session table is based on the IP 5-tuple, but in the processing of Outbound packets, the modified IP 5-tuple that results from the network address translation process is used rather than the IP 5-tuple as received in the packet. Note that in each case, the process results in the use of global parameters to identify the at least one computer system within the local domain. A significant aspect of the method and system herein disclosed comprises a manipulation of the search key either for inbound packets, for outbound packets, or for both, in order to generate a symmetric search key. Generating a symmetric search key requires that the process for generating a Session Table search key for an Inbound packet associated with a session would generate a search key that is identical to one generated by the process for generating a search key for an outbound packet associated with the same session. Thus each session may be represented by a single entry in the session table to manage both directions of flow associated with that session. One embodiment of the subject invention generates the symmetric search key by transposing source and destination parameters for one direction of flow but not the other. Another embodiment of the subject invention generates the symmetric search key by applying an arithmetic manipulation to the source and destination parameters for both directions of flow as described in co-pending U.S. patent application Ser. No. 09/908,836 entitled "METHOD AND SYSTEM FOR PROVIDING A SYMMETRIC KEY FOR MORE EFFICIENT SESSION IDENTIFICATION" filed on Jul. 19, 2001 and assigned to the assignee of the present application, thus resulting in identical search keys for both Inbound and Outbound flows.

According to the system and method disclosed herein, the present invention performs network address translation asymmetrically for packets flowing to and from the at least one computer system within the local domain. This process enables session information to be more efficiently stored and accessed.

DETAILED DESCRIPTION OF THE INVENTION

The present invention relates to an improvement in communication between computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A method and system for performing network address translations for a session in a network is disclosed. The network includes at least one computer system within the local domain. Each of the at least one computer system within the local domain has a local address and is associated with a global address. The session exchanges a plurality of packets that travel to and from a second at least one computer system outside of the local domain. Each of the plurality of packets includes source information and destination information. The method and system comprise searching a global address table for a match of a key for each of the plurality of packets. Through this search, the direction of flow for each of the plurality of packets is determined. The key is provided using a portion of the destination information. The global address table includes at least one entry, each of which corresponds to the global address for a first corresponding computer system. The method and system also comprise asymmetrically translating the source information and destination information for each of the plurality of packets using an address translation table based on whether or not the full match is found. The translation is asymmetric because a different translation mechanism is selected for packets flowing in a different direction. The address translation table includes at least one entry. Each of the at least one entry corresponds to the local address for a second corresponding computer system of the at least one computer system or a global host name for a shared host.

The present invention will be described in terms of particular computer systems in particular networks. However, one of ordinary skill in the art will readily recognize that this method and system will operate effectively for other computer systems and other computer networks. Furthermore, the present invention will be described in terms of particular information in an IP five-tuple for a packet. However, one of ordinary skill in the art will readily recognize that the method and system can operate effectively for other fields or other information identifying the packet, the session and/or the source and destination of the packet.

Figure 4:
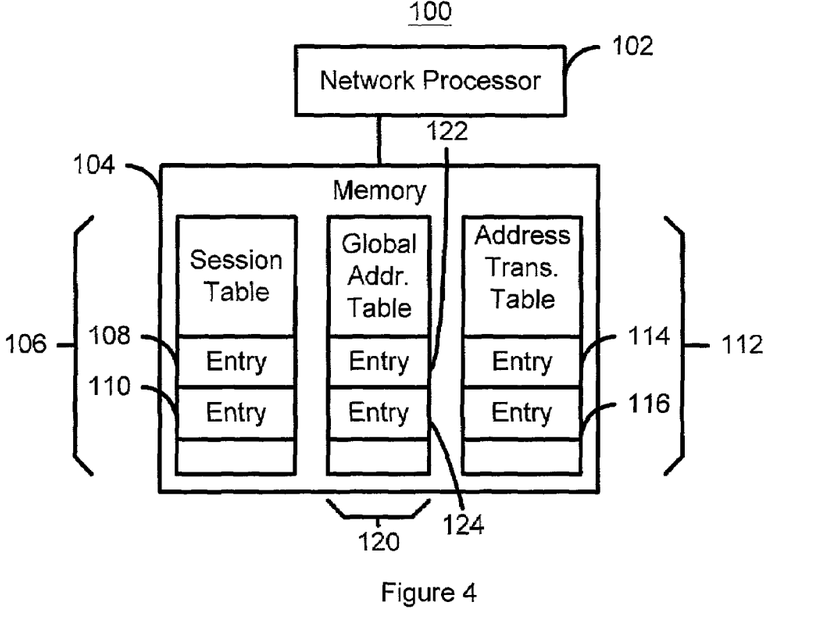
FIG. 4 is one embodiment of a system in accordance with the present invention for performing asymmetric network address translation.

To more particularly illustrate the method and system in accordance with the present invention, refer now to FIG. 4, depicting one embodiment of a system 100 in accordance with the present invention for performing asymmetric network address translation in a computer network. The system 100 includes a network processor 102 and a memory 104 including an address translation table 112, a global address table 120 and, in a preferred embodiment, a session table 106. The network processor 102 preferably resides in a router, such as the router 2 or 16. The session table 106 generally includes a plurality of entries. However, for clarity only two entries 108 and 110 are shown. The address translation table 112 typically includes a plurality of entries. However, for clarity only two entries 114 and 116 are shown. Each entry 114 and 116 can correspond to a local address for a computer system or to a globally recognized host that shares access to a particular computer system (termed shared hosts herein). In one embodiment, the address translation table 114 and 116 also include other data, such as the protocol. The address translation table is indexed using some function of the packet information identifying the local computer system (i.e. IP address, TCP port), where the port is used to differentiate multiple global host names sharing a common computer system. However, destination address information is specifically excluded from indexing the address translation table. The global address table 120 includes a plurality of entries. However, for clarity, only two entries 122 and 124 are shown. The global address table 120 is preferably indexed using the global address. Thus, search key for the global address table 120 is simply the destination address for a packet. Generally, the address translation table 112 is relatively small, containing a few thousand entries. The global address table 120 is typically even smaller. Furthermore, both the global address table 120 and the address translation table 112 are generally relatively static. The session table 106 preferably includes a single entry for each session. The network processor 102 preferably implements the method in accordance with the present invention, described below.

Figure 5:
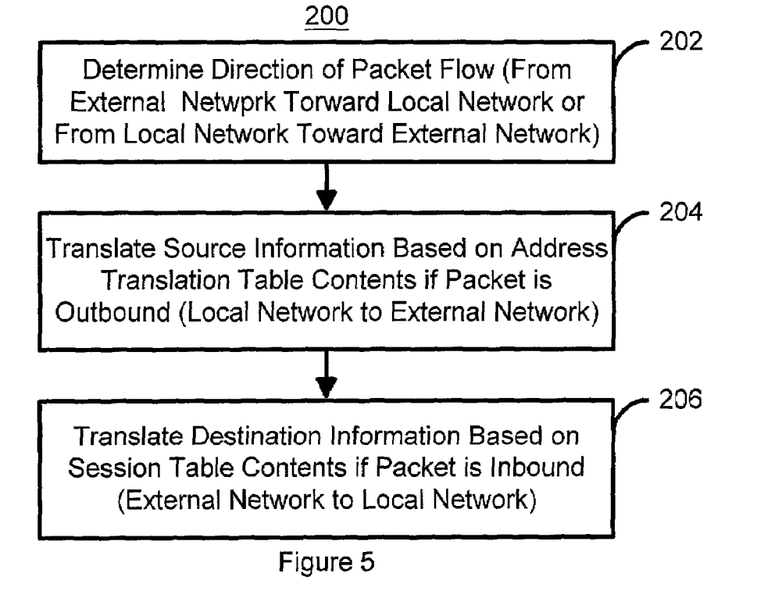
FIG. 5 is a high-level flow chart depicting one embodiment of a method in accordance with the present invention for performing asymmetric network address translation.

FIG. 5 depicts a high-level flow chart of one embodiment of a method 200 in accordance with the present invention for performing asymmetric network address translation in a computer network. The method 200 may be used in a computer network, such as the computer networks 1 and 15. More specifically, the method 200 is preferably implemented by the network processor 102. The method 200 is preferably performed before any session look up is performed. The method 200 is also performed for each packet in the session. The method 200 uses the source and destination information in each packet. Preferably, this source and destination information is from the source and destination fields of the IP five-tuple 30. The IP five-tuple 30 may include a local or a global address in the source address field 34 or the destination address field 38, depending upon the direction of travel of the packet. Consequently, the method 200 is described in conjunction with FIGS. 1 (depicting computer networks 1 and 15), 2 (depicting the IP five-tuple 30), and 3 (depicting the system 100). The method 200 is performed for a packet associated with a particular session between a first and a second computer system. For clarity, the method 200 is described in the context of a session between the server 18 and the client 4.

Referring to FIGS. 1, 2, 4 and 5, a direction of flow of the packet, from an external network toward a local network or from the local network to an external network is determined using a search of the global address table 120 for the packet in the session, via step 202. The search preferably attempts to find a full match for a key that is provided using a portion of the destination information of the packet. Thus, the key is provided using the destination address 38 and/or the destination port 40. The key could include other parameters, such as the protocol type. In a preferred embodiment, the full match search is performed using the method described in co-pending U.S. patent application Ser. No. 09/543,531 entitled "FULL MATCH (FM) SEARCH ALGORIGHM IMPLEMENTATION FOR A NETWORK PROCESSOR" filed on Apr. 6, 2000 and assigned to the assignee of the present application. Applicant hereby incorporates by reference the above-identified patent application. If a match is found, the destination information for the packet includes the global address of the server 18. Consequently, packet is traveling from the client computer system 2 outside of the local domain 15 to the server computer system 18 within the local domain 15. If a full match is not found, the destination information for the packet does not include the local address of the server 18. Consequently, the packet is traveling from the server 18 to the client 4. Thus, the direction of flow of the packet is determined using step 202.

The source and destination information for the packet are then asymmetrically translated in a manner that is based on whether the full match of the key was found in the search of the global address table 120. Thus, if the packet is outbound from the local network, the source information is translated based on the data in the address translation table 112, via step 204. If the packet is inbound to the local network, then the destination information is translated based on the data in the session table 106, via step 206. The asymmetric translation performed in steps 204 and 206 not only performs the translation between local and global addresses and ports, but also allows a symmetric search key to be provided for use in identifying the session corresponding to the packet.

Using the asymmetric address translation is performed using the method 200, a symmetric key can be used in indexing the session. As a result, the session table 104 can include a single entry for each session and can be indexed using the symmetric key. Use of a symmetric key is described in more detail in co-pending U.S. patent application Ser. No. 09/908,836 entitled "METHOD AND SYSTEM FOR PROVIDING A SYMMETRIC KEY FOR MORE EFFICIENT SESSION IDENTIFICATION," filed on Jul. 19, 2001 and assigned to the assignee of the present application. Because only a single entry in the session table 104 is used, less memory is required. In addition, synchronization between two entries for a single session can be avoided. Resources are, therefore, conserved. Moreover, the global address table 120 and the address translation table 112 are relatively static. Thus, maintenance of global address table 120 and the address translation table 112 is relatively easy and does not consume a great deal of resources.

Figure 6:
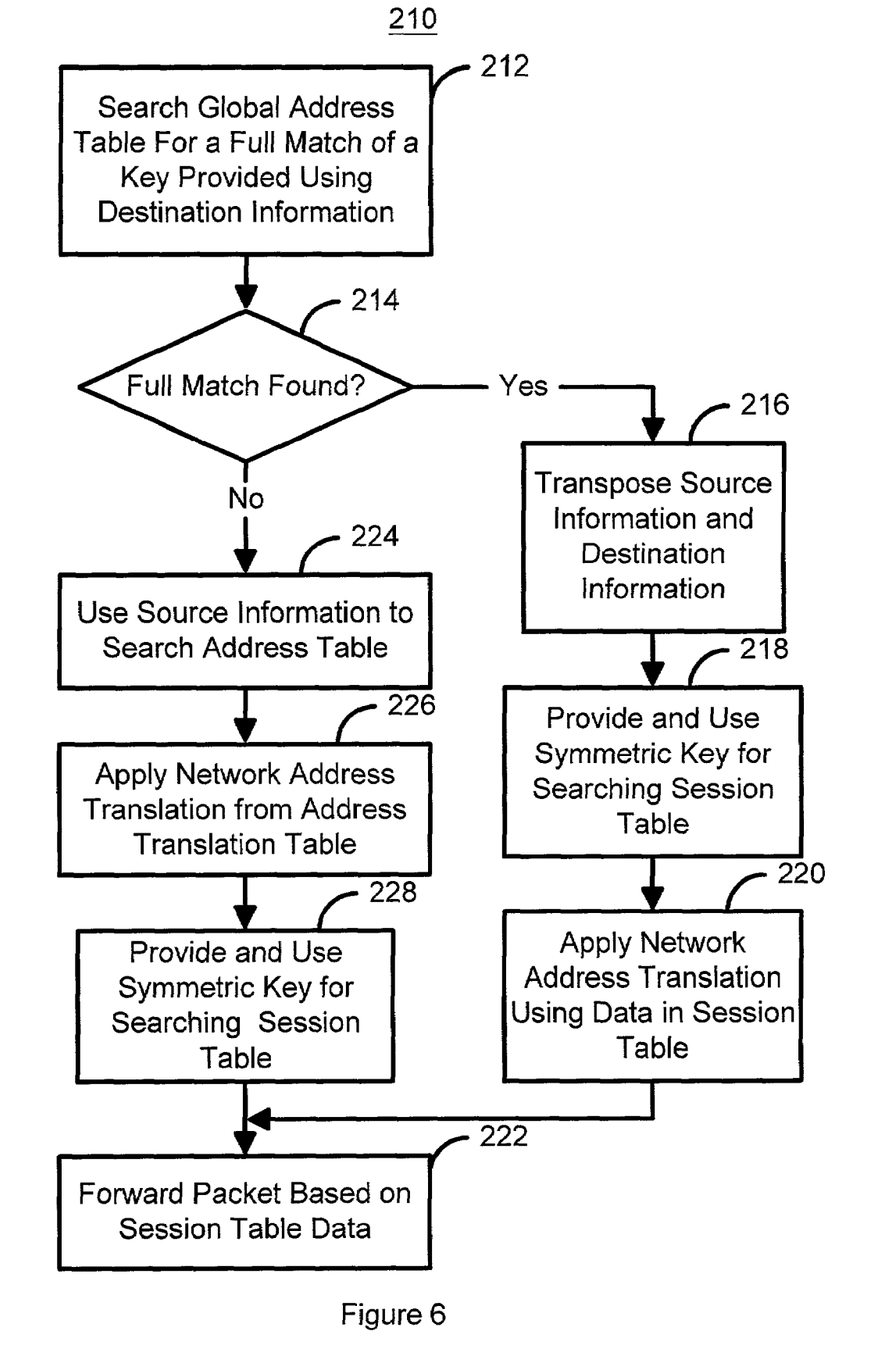
FIG. 6 is a more detailed flow chart of one embodiment of a method in accordance with the present invention for routing packets using asymmetric network address translation.

FIG. 6 depicts a more detailed flow chart of one embodiment of a method 210 for routing packets using asymmetric network address translation. The method 210 may be used in a computer network, such as the computer networks 1 and 15. More specifically, the method 210 is preferably implemented by the network processor 102. The method 210 is also performed for each packet in the session. The method 210 uses the source and destination information in each packet. Preferably, this source and destination information is from the source and destination fields of the IP five-tuple 30. The IP five-tuple 30 may include a local or a global address as the source address 34 or the destination address 38 and a local or global port as the source port 36 or the destination port 40, depending upon the direction of travel of the packet. The method 210 is described in conjunction with FIGS. 1 (depicting computer networks 1 and 15), 2 (depicting the IP five-tuple 30), and 3 (depicting the system 100). The method 210 is performed for a packet associated with a particular session between a first and a second computer system. For clarity, the method 210 is described in the context of a session between the server 18 and the client 4 as packets for the session are processed by the router 16.

Referring to FIGS. 1, 2, 4 and 6, the method 210 preferably commences after receipt of a packet. A search for a full match of a key formed using a portion of the source information for the packet in the session is performed on the global address table 120, via step 212. The key is preferably formed from the destination address 38 and/or the destination port 40 for the packet. The global address translation table 120 is thus indexed using a function of global addresses of server computer systems within the local network domain 15 and/or the global addresses of systems sharing a particular server computer system in the local network domain 15. In a preferred embodiment, the full match search is performed using the method described in the above-identified co-pending U.S. patent application Ser. No. 09/543,531 entitled "FULL MATCH (FM) SEARCH ALGORIGHM IMPLEMENTATION FOR A NETWORK PROCESSOR".

It is determined whether the full match is found in the global address table 120, via step 214. In one embodiment, step 214 is performed merely by accessing the data corresponding to the local address if the full match is found in the global address table 120. If a match is found, the packet is traveling from the client computer system 2 outside of the local network domain 15 to the server computer system 18 within the local network domain 15. The source and destination information are transposed, via step 216. A symmetric key is then provided using the transposed source and destination information and used in searching the session table 106, via step 218. Preferably, step 218 is performed by hashing the IP five-tuple that includes the transposed information. The key is symmetric with the corresponding key used for packets flowing in the opposite direction because the source and destination information have been transposed for this direction of packet flow but not for the opposite direction of packet flow. Network address translation is then performed using the information found in the session table 106, via step 220. The packet would then be forwarded using the information found in the session table 106, via step 222.

If a full match is not found, the packet is traveling from the server 18 to the client 4. If the full match is not found in step 214, then the source information for the packet is used to search the address translation table 112 for the information used to perform network address translation, via step 224. Network address translation is then performed using the information obtained in the address translation table 112, via step 226. A symmetric key is then provided and used to search the session table 106, via step 228. The symmetric key is preferably formed without transposing the source and destination information. The packet would then be forwarded using the information found in the session table 106, via step 222.

Thus, the method 210 transposes the source and destination address to form the symmetric key when the packet is traveling from the client to the server, but does not transpose the source and destination address to form the search key when the packet is traveling from the server to the client. The key will, therefore, be the same for all packets in the session. In other words, the key is symmetric with respect to packets traveling to and from the server 18. Consequently, selecting steps 224 and 226 or alternately step 216 results in providing a symmetric key for use in accessing the session table 106 during step 228 or step 220, respectively. As a result, data for the session can be included in a single entry in the session table 104. The session table 104 can thus be made smaller. In addition, synchronization between two entries for a single session can be avoided. Resources are, therefore, conserved. Moreover, the address translation table 112 and global address table 120 are relatively static because the computer systems, such as the servers 18, 20, 22 and 24 typically do not change rapidly over time. Thus, maintenance of the address translation table 112 and the global address table 120 is relatively easy and does not consume a great deal of resources.

Figure 7:
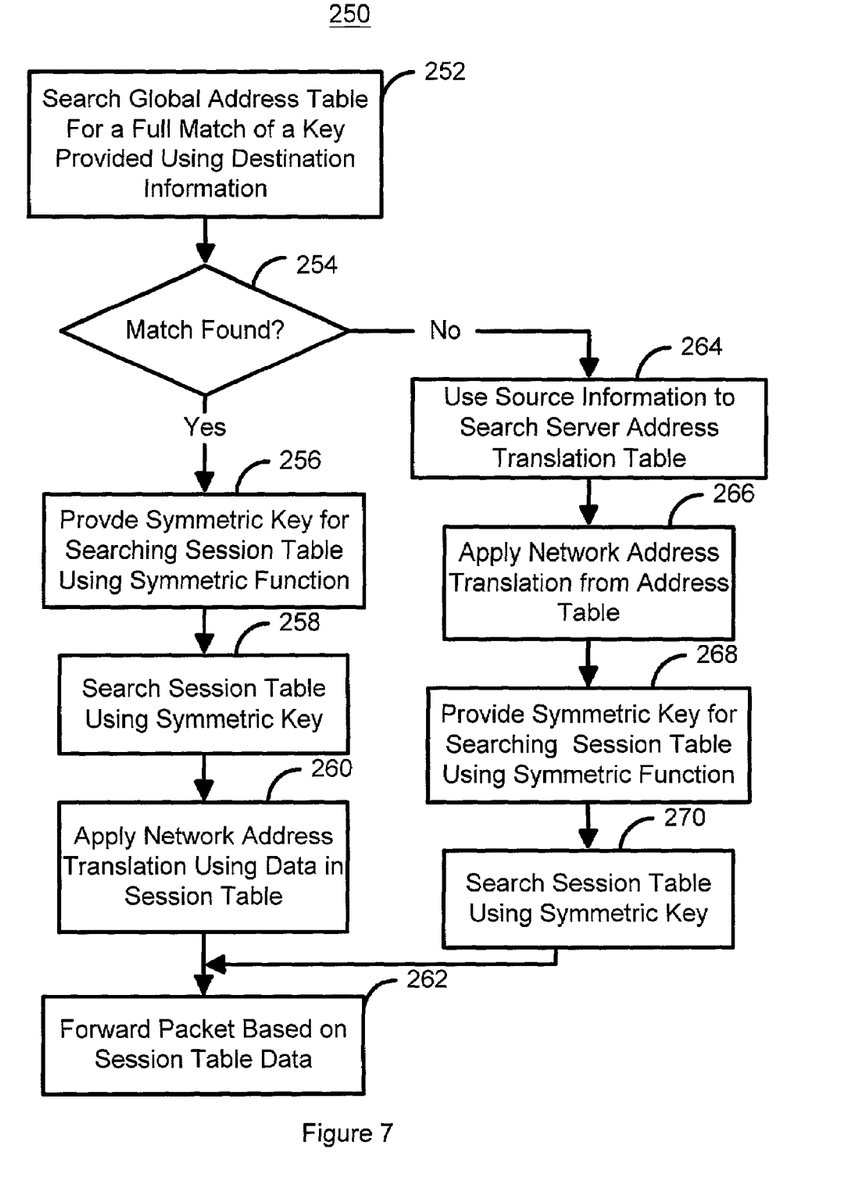
FIG. 7 is a more detailed flow chart of an alternate embodiment of a method in accordance with the present invention for routing packets using asymmetric network address translation.

FIG. 7 depicts a more detailed flow chart of an alternate embodiment of a method 250 for routing packets using asymmetric network address translation. The method 250 may be used in a computer network, such as the computer networks 1 and 15. More specifically, the method 250 is preferably implemented by the network processor 102. The method 250 is also performed for each packet in the session. The method 250 uses the source and destination information in each packet. Preferably, this source and destination information is from the source and destination fields of the IP five-tuple 30. The IP five-tuple 30 may include a local or a global address as the source address 34 or the destination address 38 and a local or global port as the source port 36 or the destination port 40, depending upon the direction of travel of the packet. The method 210 is described in conjunction with FIGS. 1 (depicting computer networks 1 and 15), 2 (depicting the IP five-tuple 30), and 3 (depicting the system 100). The method 210 is performed for a packet associated with a particular session between a first and a second computer system. For clarity, the method 250 is described in the context of a session between the server 18 and the client 4, as packets for the session are processed by the router 16.

Referring to FIGS. 1, 2, 4 and 6, the method 250 preferably commences after receipt of a packet. A search for a full match of a key formed using a portion of the source information for the packet in the session is performed on the global address table 120, via step 252. The key is preferably formed from the destination address 38 and/or the destination port 40 for the packet. The global address translation table 120 is thus indexed using a function of the global addresses of the server computer system 18, 20, 22, and 24 in the local network domain 15 and/or the global addresses of systems sharing a particular server computer system 18, 20, 22 or 24 in the local network domain 15. In a preferred embodiment, the full match search is performed using the method described in the above-identified co-pending U.S. patent application Ser. No. 09/543,531 entitled "FULL MATCH (FM) SEARCH ALGORIGHM IMPLEMENTATION FOR A NETWORK PROCESSOR".

It is determined whether the full match is found in the global address table 120, via step 254. In one embodiment, step 254 is performed merely by accessing the data corresponding to the local address if the full match is found in the global address table 120. If a match is found, the packet is traveling from the client 4 to the server 18. A symmetric key is then provided using a symmetric function, via step 256. Use of a symmetric key is described in more detail in co-pending U.S. patent application Ser. No. 09/543,531 entitled "FULL MATCH (FM) SEARCH ALGORIGHM IMPLEMENTATION FOR A NETWORK PROCESSOR" filed on Apr. 6, 2000 and assigned to the assignee of the present application. Preferably, the symmetric function utilizes the source address 34 and/or port 36 added to the destination address 38 and/or port 40, respectively and the absolute value of the source address 34 and/or port 36 subtracted from the destination address 38 and/or port 40, respectively. Thus, the symmetric key is provided.

The session table 106 is then searched using the symmetric key, via step 258. Network address translation is then performed using the data found in the session table 106, via step 260. The packet can then be forwarded using the data found in the session table, via step 262.

If a full match is not found, the packet is traveling from the server 18 to the client 4. If the full match is found in step 254, then the source information for the packet is used to search the address translation table 112 for the information used to perform network address translation, via step 264. Network address translation is then performed using the information obtained in the address translation table 112, via step 266. A symmetric key is then provided using the symmetric function, via step 268. The symmetric function is preferably the same symmetric function used in step 256. The symmetric key is used to search the session table 106, via step 270. The packet would then be forwarded using the information found in the session table 106, via step 262.

Thus, the method 250 uses a symmetric function to provide the symmetric key. As a result, the symmetric key can be provided without transposing source and destination information. In addition, the key will be the same for all packets in the session. In other words, the key is symmetric with respect to packets traveling to and from the server 18.

As a result, data for the session can be included in a single entry in the session table 104. The session table 104 can thus be made smaller. In addition, synchronization between two entries for a single session can be avoided. Resources are, therefore, conserved. Moreover, the address translation table 112 and global address table 120 are relatively static because the computer systems, such as the servers 18, 20, 22 and 24 typically do not change rapidly over time. Thus, maintenance of the address translation table 112 and the global address table 120 is relatively easy and does not consume a great deal of resources. Consequently, the method 250 allows for more efficient address translation in a network.

A method and system has been disclosed for performing asymmetric address translation in a computer network. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing network address translations for a session in a network, the network including at least one local network domain, the local network domain including at least one computer system, each of the at least one computer system having a local address and being associated with a global address, the session exchanging a plurality of packets that travel to and from a second at least one computer system within the network, each of the second at least one computer system being connected to the network outside of the local network domain, each of the plurality of packets including source information and destination information, the method comprising the steps of:
    searching a global address table for a match of a key for each of the plurality of packets to determine a direction of travel for each of the plurality of packets, the key being provided using a portion of the destination information, the global address table including at least one entry, each of the at least one entry corresponding to the global address for a first corresponding computer system; and
    asymmetrically translating the source information and destination information for each of the plurality of packets using an address translation table or session table based on a direction the packet is traveling, the address translation table including at least one entry, each of the at least one entry corresponding to the local address for a first at least one computer system within the at least one local network domain of the network, the session table including at least one session table entry, each of the at least one session table entry corresponding to a specific connection between two computer systems, the asymmetric translating including providing a symmetric key for indexing a session table, the symmetric key being symmetric for bi-directional traffic.

2. The method of claim 1, wherein the asymmetrically translating step further includes the steps of:
    determining that the direction the packet is traveling is inbound if an exact match is found while searching the global address table, and determining that the direction the packet is traveling is outbound if the exact match is not found while searching the global address table.

3. The method of claim 1 wherein the direction of travel can be inbound or outbound and wherein the asymmetrically translating step further includes the steps of:
    translating the source information using the address translation table if the packet is outbound; and
    translating the destination information using the session table if the packet is inbound.

4. The method of claim 1 wherein at least one global port is associated with the network beyond the local network domain and at least one local port is associated with the local network domain connecting the first at least one computer system to the network, and wherein asymmetrically translating the source information and destination information in step further includes the steps of:
    if the full match is found, transposing the destination information with the source information, providing the symmetric key using transposed source and destination information, using the symmetric key to search the session table and then performing network address translation using session table data; and
    if the full match is not found, searching the address translation table using the source information, performing the network address translation using address translation table data, providing the symmetric key from translated source parameters, and using the symmetric key to search the session table.

5. The method of claim 1 further including the steps of:
    utilizing the symmetric key to access an entry for the session in the session table.

6. The method of claim 5 wherein the session table has a single entry per session.

7. The method of claim 1 wherein the first at least one computer system is a server.

8. The method of claim 6, wherein the server is partitioned into multiple logical servers, each of which has a different global network address.

9. The method of claim 1 wherein at least one global port is associated with the network beyond the local network domain, and at least one local port is associated with the local network domain connecting the first at least on computers system to the network and wherein asymmetrically translating the source information and destination information in step further includes the steps of:
    if the full match is found, providing a symmetric key using a symmetric function, using the symmetric key to search the session table and then performing network address translation using session table data; and
    if the full match is not found, searching the address translation table using the source information, performing the network address translation using address translation table data, providing the symmetric key using the symmetric function and using the symmetric key from translated source parameters to search the session table.

10. The method of claim 1 wherein the direction of travel can be inbound or outbound and wherein the processor asymmetrically translates the source information by translating the source information using the address translation table if the packet is outbound and translates the destination information using the session table if the packet is inbound.

11. A system for performing network address translations for a session in a network, the network including at least one local network domain, the local network domain including at least one computer system, each of the at least one computer system having a local address and being associated with a global address, the session exchanging a plurality of packets that travel to and from a second at least one computer system within the network, each of the second at least one computer system being connected to the network outside of the local network domain, each of the plurality of packets including source information and destination information, the system comprising:

a memory for storing an address translation table, a global address table and a session table, the address translation table including at least one entry, the address translation table including at least one entry, each of the at least one entry corresponding to the local address for a first corresponding computer system within the at least one local network domain of the network, the session table including at least one session table entry, each of the at least one session table entry corresponding to a specific connection between two computer systems, the global address table including at least one entry, each of the at least one entry corresponding to the global address for a first at least one corresponding computer system; and a processor for searching the global address table for a full match of a key for each of the plurality of packets, the key being provided using a portion of the source destination information, the processor also for asymmetrically translating the source information and destination information for each of the plurality of packets using the address translation table or a session table based on a direction the packet is traveling, the asymmetric translating including the processor providing a symmetric key for indexing a session table, the symmetric key being symmetric for bi-directional traffic.

12. The system of claim 11, wherein the processor asymmetrically translates the source information by determining that the direction the packet is traveling is inbound if an exact match is found while searching the global address table, and determining that the direction the packet is traveling is outbound if the exact match is not found while searching the global address table.

13. The system of claim 12 wherein the computer system wherein the session table is indexed using the symmetric key and wherein the processor identifies the session utilizing the symmetric key to access an entry for the session in the session.

14. The system of claim 13 wherein the session table has a single entry per session.

15. The system of claim 11 wherein at least one global port is associated with the network beyond the local network domain and at least one local port is associated with the local network domain connecting the first at least one computer system to the network, and wherein if the full match is found, the processor provides a symmetric key using a symmetric function, uses the symmetric key to search the session table and then performs network address translation using session table data; and wherein if the full match is not found, the processor searches the address translation table using the source information, performs the network address translation using address translation table data, provides the symmetric key from translated source parameters, and uses the symmetric key to search the session table.

16. The system of claim 11 wherein the first at least one computer system is a server.

17. The system of claim 16, wherein the server is partitioned into multiple logical servers, each of which has a different global network address.

18. A computer-readable medium containing a program for performing network address translations for a session in a network, the network including at least one local network domain, the local network domain including at least one computer system, each of the at least one computer system having a local address and being associated with a global address, the session exchanging a plurality of packets that travel to and from a second at least one computer system within the network, each of the second at least one computer system being connected to the network outside of the local network domain, each of the plurality of packets including source information and destination information, the program including instructions for:

searching a global address table for a match of a key for each of the plurality of packets to determine a direction of travel for each of the plurality of packets, the key being provided using a portion of the destination information, the global address table including at least one entry, each of the at least one entry corresponding to the global address for a first corresponding computer system; and asymmetrically translating the source information and destination information for each of the plurality of packets using an address translation table or session table based on a direction the packet is traveling, the address translation table including at least one entry, each of the at least one entry corresponding to the local address for a first corresponding computer system within the at least one local network domain of the network, the session table including at least one entry, each of the at least one entry corresponding to a specific connection between two computer systems, the asymmetric translating including providing a symmetric key for indexing a session table, the symmetric key being symmetric for bi-directional traffic.

19. The computer-readable medium of claim 18, wherein the asymmetrically translating instructions further includes instructions for:

determining that the direction the packet is traveling is inbound if an exact match is found while searching the global address table, and determining that the direction the packet is traveling is outbound if the exact match is not found while searching the global address table.

20. The computer-readable medium of claim 18 wherein the direction of travel can be inbound or outbound and wherein the asymmetrically translating instructions further includes instructions for:

translating the source information using the address translation table if the packet is outbound; and translating the destination information using the session table if the packet is inbound.

21. The computer-readable medium of claim 18 wherein at least one global port is associated with the network beyond the local network domain and at least one local port is associated with the local network domain connecting the first at least one computer system to the network, and wherein asymmetrically translating the source information and destination information in instructions further includes instructions for:

if the full match is found, transposing the destination information with the source information, providing a symmetric key using transposed source and destination information, using the symmetric key to search the session table and then performing network address translation using session table data; and if the full match is not found, searching the address translation table using the source information, performing the network address translation using address translation table data, providing the symmetric key from translated source parameters, and using the symmetric key to search the session table.

22. The computer-readable medium of claim 18 wherein the program further includes instructions for:

utilizing the symmetric key to access an entry for the session in the session table.

23. The computer-readable medium of claim 22 wherein the session table has a single entry per session.

24. The computer-readable medium of claim 18 wherein the first at least one computer system is a server.

25. The computer-readable medium of claim 24, wherein the server is partitioned into multiple logical servers, each of which has a different global network address.

26. The computer-readable medium of claim 18 wherein at least one global port is associated with the network beyond the local network domain, and at least one local port is associated with the local network domain connecting the first at least on computers system to the network and wherein asymmetrically translating the source information and destination information in instructions further includes instructions for:

if the full match is found, providing the symmetric key using a symmetric function, using the symmetric key to search a session table and then performing network address translation using session table data; and if the full match is not found, searching the address translation table using the source information, performing the network address translation using address translation table data, providing the symmetric key using the symmetric function and using the symmetric key from translated source parameters to search the session table.

* * * * *